United States Patent [19]

Bederke et al.

[11] Patent Number: 5,710,208
[45] Date of Patent: Jan. 20, 1998

US005710208A

[54] BINDER COMPOSITION, COATING COMPOSITION CONTAINING THIS BINDER, PRODUCTION AND USE THEREOF

[75] Inventors: Klaus Bederke, Sprockhövel; Carmen Flosbach, Wuppertal; Eva Frigge, Bochum; Walter Schubert, Wuppertal, all of Germany

[73] Assignee: Herberts GmbH, Wuppertal, Germany

[21] Appl. No.: 542,544

[22] Filed: Oct. 13, 1995

Related U.S. Application Data

[63] Continuation of Ser. No. 148,681, Nov. 4, 1993, abandoned.

[30] Foreign Application Priority Data

Nov. 7, 1992 [DE] Germany ............... 42 37 659.9

[51] Int. Cl.$^6$ ...................................... C08J 3/00
[52] U.S. Cl. .................. 524/513; 524/522; 524/539
[58] Field of Search ................... 525/208, 221, 525/227, 451, 418, 523, 533, 109, 437, 408; 524/539, 522, 513

[56] References Cited

U.S. PATENT DOCUMENTS

| | | | |
|---|---|---|---|
| 4,680,361 | 7/1987 | Koleske et al. | 526/318 |
| 4,707,535 | 11/1987 | Koleske | 528/110 |
| 5,212,241 | 5/1993 | Woo et al. | 525/109 |

*Primary Examiner*—E. Rollins Buffalow
*Attorney, Agent, or Firm*—Schweitzer Cornman Gross & Bondell LLP

[57] ABSTRACT

A binder composition, a coating composition containing this binder, a process for its production and use to produce single or multi-layer lacquer coatings, particularly in the automotive sector, are described. The binder composition contains A) 25 to 75 wt. % of one of more resins containing carboxyl groups, which may contain α,β-unsaturated groups, with a number average molecular weight (Mn) of 500 to 10000 g/mol and an acid value of 15 to 200 mg KOH/g, B) 25 to 75 wt. % of one or more polyethers, polyesters, polyether/polyesters and/or (meth)acrylic copolymers with at least one α,β-unsaturated group and at least one epoxy group per molecule, wherein the α,β-unsaturated groups and epoxy groups are present in a numerical ratio of 20:80 to 80:20, with a number average molecular weight (Mn) of up to 10000 g/mol, C) 0 to 60 wt. % of one or more polyols with at least two hydroxyl functional groups per molecule, $D_1$) 0 to 20 wt. % of one or more melamine resins, $D_2$) 0 to 40 wt. % of one or more capped polyisocyanates, wherein the sum of the weight percentages of components A), B), C), $D_1$) and $D_2$) is 100 wt. %, together with E) 0 to 10 wt. % of one or more catalysts to catalyze the reaction of the carboxyl and epoxy groups, related to the sum of the weights of components A) to $D_2$), and F) 0.1 to 10 wt. % of one or more thermally or photochemically activated initiators, related to the total weight of components A) and B).

13 Claims, No Drawings

BINDER COMPOSITION, COATING COMPOSITION CONTAINING THIS BINDER, PRODUCTION AND USE THEREOF

This is a continuing application of U.S. Ser. No. 08/148,681, filed Nov. 4, 1993, now abandoned.

BACKGROUND OF THE INVENTION

The invention relates to binder compositions suitable for the production of coating compositions which are baked at elevated temperature and, in particular, are suitable for the production of multi-layer lacquer coatings, for example in the automotive sector.

Baking lacquers are known from DE-A-30 22 996 based on polymers containing carboxyl groups, such as for example acrylates based on acrylic and methacrylic acid, and acrylates containing glycidyl groups.

WO 84/00771 describes a multi-component system in which four types of binder are mixed together and then applied. The components are an acrylate containing hydroxyl groups, acid anhydride, wherein at least 50% are alkyl hexahydrophthalic acid anhydrides, epoxy resin and melamine resin. The systems have a high solids content.

DE-A-23 33 384 describes a binder based on acrylated polyesters, which are obtained by polymerisation of an acrylate containing hydroxyl groups into a polyester or alkyd resin containing hydroxyl groups. Crosslinking may then be simultaneously performed with melamine resins and epoxy resins.

DE-A-40 27 259 describes a binder system in which epoxy- and acryloyl-functional binders are cured with polyamines.

Known coating compositions in part give rise to films with elevated hardness and good weathering resistance. However, they do not fulfil the constantly increasing requirements for elevated acid and solvent resistance.

SUMMARY OF THE PRESENT INVENTION

The object of the invention is to provide a binder system which may be processed into coating compositions which may be baked at elevated temperatures to form highly acid resistant and solvent resistant coatings.

DETAILED DESCRIPTION OF THE INVENTION

It has been found that this object may be achieved by a binder composition provided by the invention which contains:

A) 25 to 75 wt. % of one of more resins containing carboxyl groups, which may contain $\alpha,\beta$-unsaturated groups, with a number average molecular weight (Mn) of 500 to 10000 g/mol and an acid value of 15 to 200 mg KOH/g, B) 25 to 75 wt. % of one or more polyethers, polyesters, polyether/polyesters and/or (meth)acrylic copolymers with at least one $\alpha,\beta$-unsaturated group and at least one epoxy group per molecule, wherein the $\alpha,\beta$-unsaturated groups and epoxy groups are present in a numerical ratio of 20:80 to 80:20, with a number average molecular weight (Mn) of up to 10000 g/mol, C) 0 to 60 wt. % of one or more polyols with at least two hydroxyl functional groups per molecule, $D_1$) 0 to 20 wt. % of one or more melamine resins, $D_2$) 0 to 40 wt. % of one or more capped polyisocyanates, wherein the sum of the weight percentages of components A), B), C), $D_1$) and $D_2$) is 100 wt. %, together with E) 0 to 10 wt. % of one or more catalysts to catalyse the reaction of the carboxyl and epoxy groups, related to the sum of the weights of components A) to $D_2$), F) 0.1 to 10 wt. % of one or more thermally or photochemically activated initiators, related to the total weight of components A) and B).

According to a preferred embodiment of the invention, the component A) resins are one or more (meth)acrylic copolymers containing carboxyl groups, which may optionally have $\alpha,\beta$-unsaturated groups. Such (meth)acrylic polymers preferably have a number average molecular weight (Mn) of 500 to 10000 g/mol and an acid value of 15 to 200 mg KOH/g, preferably 30 to 140 mg KOH/g and particularly preferably 60 to 120 mg KOH/g.

According to another preferred embodiment of the invention, the component A) resins are one or more polyesters containing carboxyl groups, which may optionally have $\alpha,\beta$-unsaturated groups. These polyesters preferably have a calculated molecular weight of 500 to 2000 g/mol. The polyesters may be present in component A) as a mixture with the above-stated (meth)acrylic copolymers.

In the production of the component A) resins containing carboxyl groups, the carboxyl groups may be introduced directly by the use of structural units containing carboxyl groups, for example during polymer formation, such as (meth)acrylic copolymers.

Examples of suitable monomers containing carboxyl groups are unsaturated carboxylic acids, such as for example acrylic, methacrylic, itaconic, crotonic, isocrotonic, aconitic, maleic and fumaric acid, semi-esters of maleic and fumaric acid together with $\beta$-carboxyethyl acrylate and adducts of acrylic acid and/or methacrylic acid hydroxyalkyl esters with carboxylic acid anhydrides, such as for example phthalic acid mono-2-methacryloyloxyethyl ester.

In the present specification and the patent claims, the term (meth)acrylic is used. This means acrylic and/or methacrylic.

It is, however, also possible in the production of the resins containing carboxyl groups initially to form a polymer containing hydroxyl and optionally carboxyl groups and with an OH value of 15 to 200 mg KOH/g and to introduce the carboxyl groups in their entirety or in part in a second stage by reacting the polymers containing hydroxyl and optionally carboxyl groups with carboxylic acid anhydrides.

Carboxylic acid anhydrides suitable for addition onto the polymers containing hydroxyl groups are anhydrides of aliphatic, cycloaliphatic and aromatic saturated and/or unsaturated di- and polycarboxylic acids, such as for example phthalic, tetrahydrophthalic, hexahydrophthalic, succinic, maleic, itaconic, glutaric, trimellitic and pyromellitic anhydrides, together with the halogenated and alkylated derivatives thereof.

Phthalic, tetrahydro- and hexahydrophthalic anhydrides, together with 5-methylhexahydrophthalic anhydride are preferably used.

Examples of hydroxyalkyl esters of $\alpha,\beta$-unsaturated carboxylic acids with primary hydroxyl groups suitable for the production of hydroxy-functional poly(meth)acrylates are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. 2-hydroxypropyl acrylate, 2-hydroxybutyl acrylate, 3-hydroxybutyl acrylate and the corresponding methacrylates are cited as examples of hydroxyalkyl esters with a secondary hydroxyl group which may be used.

Advantageously, the hydroxy-functionalised component may at least in part be a reaction product prepared from one mol of hydroxyethyl acrylate and/or hydroxyethylmethacrylate and an average of 2 mol of epsilon-caprolactone.

A reaction product of acrylic acid and/or methacrylic acid with the glycidyl ether of a carboxylic acid with a tertiary α-carbon atom may also at least in part be used as the hydroxy-functionalised component. Glycidyl esters of highly branched monocarboxylic acids are obtainable under the trade name "Cardura®". The reaction of the acrylic acid or methacrylic acid with the glycidyl ester of a carboxylic acid with a tertiary α-carbon atom may proceed before, during or after the polymerisation reaction.

In addition to the above-stated monomers, further ethylenically unsaturated monomers may also be used in the production of the (meth)acrylic copolymers. Selection of the further ethylenically unsaturated monomers is not critical. All that must be ensured is that incorporation of these monomers does not lead to undesirable copolymer properties.

Further suitable ethylenically unsaturated components are, for example, alkyl esters of acrylic and methacrylic acid, such as for example methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate and octadecenyl (meth)acrylate. It is also possible to use silane-modified monomers, such as for example gamma-methacryloxypropyltrimethoxysilane or gamma-methacryloxypropyl-tris(2-methoxyethoxy)-silane.

Instead of the above-stated alkyl esters of acrylic and methacrylic acid or together with these alkyl esters, further ethylenically unsaturated monomers may be used to produce (meth)acrylic copolymers, wherein selection of these monomers is largely guided by the desired properties of the coating composition in terms of hardness, elasticity, compatibility and polarity.

Examples of further suitable ethylenically unsaturated monomers are the alkyl esters of maleic, fumaric, tetrahydrophthalic, crotonic, isocrotonic, vinylacetic and itaconic acid, such as for example the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Furthermore, small proportions of monomers with at least two polymerisable, olefinically unsaturated double bonds may be used. Preferably, the proportion of these monomers is less than 5% related to the total weight of monomers.

Examples of such compounds are hexanediol diacrylate, hexanediol dimethacrylate, ethylene glycol diacrylate, ethylene glycol dimethacrylate, butanediol diacrylate, butanediol dimethacrylate, hexamethylenebismethacrylamide, trimethylolpropane triacrylate, trimethylolpropane trimethacrylate and similar compounds.

One or more monovinyl aromatic compounds may also be used as monomer components. Preferably, they contain 8 to 9 carbon atoms per molecule. Examples of such suitable compounds are styrene, vinyltoluenes, α-methylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol. Vinyltoluenes and in particular styrene are preferably used.

As mentioned above, the component A) resins containing carboxyl groups may be copolymers containing carboxyl groups and/or polyesters containing carboxyl groups. Polyesters containing carboxyl groups may be formed according to customary methods (c.f. for example B. Vollmert, Grundriβ der makromolekularen Chemie [fundamentals of macromolecular chemistry], E. Vollmert-Verlag Karlsruhe 1982, vol. II, p. 5 et seq.) from aliphatic and/or cycloaliphatic di-, tri- or polyhydric alcohols, optionally together with monohydric alcohols and from aliphatic, aromatic and/or cycloaliphatic carboxylic acids together with polybasic polycarboxylic acids. Examples of suitable alcohols are ethylene glycol, 1,2-propanediol, 1,3-propanediol, 2,2-dimethyl-1,3-propanediol, 1,2-butanediol, 1,3-butanediol, 1,4-butanediol, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane, glycerol, trimethylethane, trimethylolpropane, pentaerythritol, etherification products of diols and polyols, for example di- and triethylene glycol, polyethylene glycol, neopentyl glycol ester of hydroxypivalic acid.

Examples of suitable carboxylic acids are adipic, azelaic, tetrahydrophthalic, hexahydrophthalic, endomethyltetrahydrophthalic acid, 1,3- and 1,4-cyclohexane dicarboxylic acid, isophthalic acid, o-phthalic acid, terephthalic acid and/or their anhydrides, together with the esterifiable derivatives thereof.

The calculated molecular weights of the polyesters are between 500 and 2000 g/mol.

The listed carboxy-functional resins may be chain extended with a lactone in a further reaction stage. These cyclic esters attach themselves to carboxyl groups, wherein the ring is opened producing a new terminal carboxyl group. Epsilon-caprolactone is a particularly preferred lactone.

Examples of other lactones are gamma-butyrolactone and lactones such as beta-propiolactone, delta-valerolactone, delta-butyrolactone, zeta-enantholactone, eta-caprylolactone. Such lactones may be substituted; examples are 6-methyl-epsilon-caprolactone, 3-methyl-epsilon-caprolactone, 5-methyl-epsilon-caprolactone, 5-phenol-epsilon-caprolactone, 4-methyl-delta-valerolactone, 3,5-dimethyl-epsilon-caprolactone and mixtures thereof.

The addition reaction with the lactone proceeds, for example, after resin synthesis, for example at an elevated temperature of for example 100° C. The reaction may, for example, be performed with stirring, for example, for up to 10 hours.

The lactone-modified resin may then optionally be partially acrylated by the addition of an α,β-unsaturated epoxy compound. Examples of α,β-unsaturated epoxy compounds are glycidyl acrylate and glycidyl methacrylate. Production proceeds, for example, by heating the COOH-functionalised resin to for example 120° C. while stirring and adding the unsaturated glycidyl compound dropwise over for example 10 to 30 minutes. Stirring is continued until the reaction has run its full course.

The binder composition according to the invention contains as component B) one or more polyethers, polyesters, polyether/polyesters and/or (meth)acrylic copolymers with at least one α,β-unsaturated group and at least one epoxy group per molecule. According to a preferred embodiment of the invention, this component is a glycidyl- and (meth)acryloyl-functional component, which according to a preferred embodiment contains one or more glycidyl- and (meth)acryloyl-functional compounds with at least one of each of the functional groups of the formula

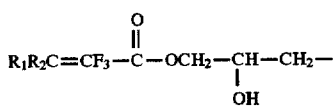

and/or

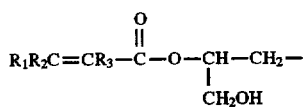

and

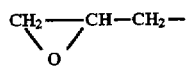

in which $R_1$, $R_2$ and $R_3$ may mutually independently be a hydrogen atom or an unbranched or branched alkyl residue with 1 to 10 carbon atoms;

wherein I and II are bonded to the residue of one or more a) polyols from the group of unbranched or branched (cyclo)aliphatic and/or aromatic di- or polyols with 2 to 12 carbon atoms, with a number average molecular weight (Mn) of up to 2000,
b) polyester polyols or polyether polyols with a number average molecular weight (Mn) of 500 to 2000 and/or
c) poly(meth)acrylic acid esters, optionally copolymerised with $\alpha,\beta$-unsaturated monomers, with a number average molecular weight Mn of 1000 to 10000.

The numerical ratio of epoxy to $\alpha,\beta$-unsaturated groups in the binder is between 20:80 and 80:20, preferably between 30:70 and 70:30. The numerical ratio relates to the ratio of the total number of epoxy groups to the total number of $\alpha,\beta$-unsaturated groups in one molecule.

The binder component of the binder according to the invention, which component contains at least one each of a glycidyl and an $\alpha,\beta$-unsaturated group, may for example be produced by the reaction of di- or polyepoxides with $\alpha,\beta$-unsaturated carboxylic acid with opening of the oxirane ring. Customary di- or polyepoxides are for example polyglycidyl ethers based on diethylene glycol, dipropylene glycol, polypropylene glycol with a number average molecular weight Mn of up to 2000, triglycidyl ethers of glycerol and/or di- or polyphenols such as bisphenol A.

Further examples of di- or polyepoxides are those based on di- or polyglycidyl esters. Examples of these are the reaction products of 1-hydroxy-2,3-epoxypropane with phthalic or terephthalic acid to form phthalic or terephthalic acid bis(2,3-epoxypropyl ester) or a diglycidyl ether of bisphenol A with trimellitic anhydride to form polyesters with a number average molecular weight Mn of 500 to 2000.

Further examples which may also be used are glycidyl-functionalised (meth)acrylic polymers. Examples of these are copolymers of glycidyl (meth)acrylate 1,2-epoxybutyl acrylate or 2,3-epoxycyclopropyl acrylate. Comonomers which may be selected are (meth)acrylic acid esters, such as for example methyl, ethyl, butyl, isobutyl, ethylhexyl, cyclohexyl and/or lauryl (meth)acrylate, hydroxy-functionalised (meth)acrylic acid esters such as for example hydroxyethyl and/or hydroxypropyl ester, together with styrene, vinyltoluene and/or $\alpha$-methylstyrene. The number average molecular weight (Mn) may be between 1000–10000, preferably 2000–5000. Further copolymerisable glycidyl monomers are, for example, (meth)allylglycidyl ether or 3,4-epoxy-1-vinylcyclohexane. The copolymers are produced by free-radical solution polymerisation, which is known to the person skilled in the art and requires no further explanation.

In order to produce the film-forming component of the binder, the di- or polyepoxides may for example be reacted with mono- or polyunsaturated monocarboxylic acids, for example with 2 to 10, preferably 3 to 6 carbon atoms, such as cinnamic acid, crotonic acid, citraconic acid, sorbic acid, maleic acid, fumaric acid, preferably acrylic and/or methacrylic acid.

In order to synthesise the glycidyl- and $\alpha,\beta$-unsaturated functionalised compounds, the reaction components may be heated in a solvent. Aprotic organic solvents are suitable solvents. It is favourable to perform the synthesis under inert gas. The unsaturated monocarboxylic acid is used in a quantity such that the desired numerical ratio of epoxy and $\alpha,\beta$-unsaturated groups is achieved.

The reaction is continued until the introduced unsaturated monocarboxylic acid has been consumed. An example of the synthesis of the epoxy- and $\alpha,\beta$-unsaturated functionalised compounds is given below. The epoxy-functionalised compound is dissolved in an aprotic organic solvent under inert gas and heated, for example, to 80° C. The unsaturated monocarboxylic acid, which may optionally be dissolved in an organic aprotic solvent, is then apportioned over a period of for example 1 hour. The reaction solution is then stirred at 80° C. until the acid value of the solution is less than 1 mg KOH/g of solid resin.

It is also possible to use binder components A) and B) in precondensed form. To this end, the binder components A) and B) may be partially precondensed in a further reaction stage. This may for example be achieved by heating components A) and B) together (for example while being stirred, for example to temperatures of 80° to 120° C.). The desired degree of precondensation may for example be determined by the achieved acid value; the reaction is, for example, continued until the acid value of the mixture has fallen by for example 2 to 5 mg KOH/g of solid resin; self-evidently, it is also possible to reduce the acid value further; care should be taken here to ensure that the viscosity of the mixture does not rise as far as gelation. The storage stability of the compositions may be further increased by such precondensation.

The binder composition according to the invention may contain one or more polyols with at least two hydroxyl functional groups per molecule as component C). These polyols may, for example, be selected from a) polyols from the group of unbranched or branched alkane di- and polyols with 2 to 12 carbon atoms or,
b) poly(meth)acrylates or poly(meth)acrylamides containing hydroxyl groups based on (meth)acrylic acid hydroxyalkyl esters with 2 to 12 carbon atoms in the alkyl component or (meth)acrylic acid hydroxyalkyl amides with 2 to 12 carbon atoms in the alkyl component, optionally copolymerised with $\alpha,\beta$-unsaturated monomers, with a number average molecular weight Mn of 1000 to 10000 g/mol or
c) poly(meth)acrylates containing hydroxyl groups based on (meth)acrylic acid hydroxyalkyl esters with 2 to 12 carbon atoms in the alkyl component and optionally copolymerisable $\alpha,\beta$-unsaturated monomers, which are modified with cyclic esters of hydroxycarboxylic acids with 4 to 6 carbon atoms, with a number average molecular weight Mn of 1000 to 10000 g/mol or
d) polyester polyols or polyether polyols with a number average molecular weight Mn of 500 to 2000 g/mol.

Examples of suitable alkane di- and polyols of group a) are those with unbranched and branched chains with 2 to 12 carbon atoms. They contain at least two hydroxyl functional groups, but preferably at least three. Examples of these are propanediol, butanediol, hexanediol, glycerol, trimethylolpropane and pentaerythritol.

Examples of poly(meth)acrylates b) containing hydroxyl groups based on (meth)acrylic acid hydroxyalkyl esters are esters of acrylic or methacrylic acid with alcohols having at least two hydroxyl groups, such as 1,4-butanediol mono (meth)acrylate, 1,6-hexanediol mono(meth)acrylate or 1,2,3-propanetriol mono(meth)acrylate. Examples of poly (meth)acrylamides b) containing hydroxyl groups based on (meth)acrylic acid hydroxyalkyl amides are amides of acrylic or methacrylic acid with hydroxyalkyl amines or di(hydroxyalkyl) amines each having 2 to 12 carbon atoms in the alkyl component, which may have one or more hydroxyl groups, such as acrylic acid hydroxyethyl amide.

The component b) poly(meth)acrylates containing hydroxyl groups may be homo- or copolymers. They have a number average molecular weight (Mn) of 1000 to 10000, preferably 3000 to 6000 g/mol. Copolymerisable monomers for production of the copolymers are α,β-unsaturated monomers, free-radical polymerisable monomers from the group of esters of α,β-unsaturated carboxylic acids, such as acrylic or methacrylic acid, wherein examples of the alcohol component are methyl, ethyl, propyl alcohols and their isomers and higher homologues. Further examples are diesters of maleic or fumaric acid, wherein the alcohol component is the same as mentioned above. Further examples are aromatic vinyl compounds, such as styrene, α-methylstyrene and vinyltoluene. Further examples are vinyl esters of short-chain carboxylic acids such as vinyl acetate, vinyl propionate and vinyl butyrate.

The poly(meth)acrylates containing hydroxyl groups of the above-defined component c) may be modified poly (meth)acrylate homo- and copolymers, as described under b), the hydroxyl groups of which may be entirely or partially reacted with cyclic esters, such as for example of hydroxycarboxylic acid with 4 to 6 carbon atoms, such as gamma-butyrolactone or epsilon-caprolactone. The modified component c) poly(meth)acrylates obtained have a number average molecular weight Mn of 1000 to 10000.

Examples of component d) polyester polyols and polyether polyols are those with a number average molecular weight Mn of 500 to 2000 g/mol. Specific examples are reaction products of di- or tricarboxylic acids such as adipic acid or trimellitic acid, with polyols, wherein the polyols are present in excess. Further examples are reaction products of di- or triols, such as propanediol, butanediol or glycerol, with ethylene oxide or propylene oxide.

It is also possible to at least partially precondense binder components B) and C). To this end, it is for example possible to introduce some or all of the hydroxy-functional polyol of component C) into a vessel, optionally together with one or more organic solvents, and to react some or all of the monomers required for production of the epoxy-functional component B) intermediate in it. For example, the hydroxy-functional polyols C), optionally with solvent, may be introduced into a vessel and heated, for example to temperatures of the order of 140° C. The monomers required for production of the epoxy-functional component B) intermediate, optionally together with initiators, may be apportioned, for example over a period of up to 5 hours. The polyol component C), as defined in greater detail below, used in this procedure is preferably a polyester polyol, in particular with a number average molecular weight Mn of 500 to 2000, preferably with an acid value below 3 mg KOH/g and preferably with an OH value of 15 to 200 mg KOH/g. Such a precondensate of B) and C) may have advantages compared with a mixture of B) and C), such as for example better compatibility and more homogeneous mixing.

The binder composition according to the invention may optionally contain up to 20 wt. % of one or more melamine resins $D_1$). Examples of such melamine resins which may be used are non-water-soluble butanol or isobutanol etherified melamines such as for example the commercial products Setamin® US 138 or Maprenal® MF 610; co-etherified melamines which are etherified with both butanol and methanol, such as for example Cymel® 254, together with hexamethyloxymethyl melamine (HMM melamines) such as for example Cymel® 301 or Cymel® 303, wherein an acid catalyst such as for example p-toluenesulphonic acid may optionally be added to the latter for crosslinking.

Further examples of melamine resin crosslinking agents are customary hydrophilic and thus water-soluble or water-compatible melamine resins, such as for example methyl etherified melamines such as for example Cymel® 325, Cymel® 327, Cymel® 350 and Cymel® 370, Maprenal® MF 927.

The coating compositions according to the invention may contain one or more capped polyisocyanates as crosslinking agents (component $D_2$). Examples of usable polyisocyanates on which the capped polyisocyanates are based are cycloaliphatic, aliphatic or aromatic polyisocyanates such as tetramethylene diisocyanate, hexamethylene diisocyanate, 2,2,4-trimethylene diisocyanate, 1,12-dodecane diisocyanate, 1,3- and 1,4-cyclohexane diisocyanate, 1-isocyanato-3,3,5-trimethyl-5-isocyanato-methylcyclohexane (=isophorone diisocyanate, IPDI), perhydro-2,4'- and/or -4,4'-diphenylmethane diisocyanate, 1,3- and 1,4-phenylene diisocyanate, 2,4- and 2,6-tolylene diisocyanate, diphenylmethane-2,4' and/or -4,4' diisocyanate, 3,2'- and/or 3,4-diisocyanato-4-methyl-diphenylmethane, naphthylene-1,5 diisocyanate, triphenylmethane-4,4',4"-triisocyanate, tetramethylxylylene diisocyanate or mixtures of these compounds.

Apart from these simple isocyanates, those isocyanates containing heteroatoms in the residue linking the isocyanate groups are also suitable. Examples of these are polyisocyanates having carbodiimide groups, allophanate groups, isocyanurate groups, urethane groups, acylated urea groups and biuret groups.

Particularly well suited to the invention are known polyisocyanates which are mainly used in lacquer production, for example modification products of the above-stated simple polyisocyanates containing biuret, isocyanurate or urethane groups, in particular tris-(6-isocyanatohexyl)-biuret or low molecular weight polyisocyanates with urethane groups, as may be obtained by the reaction of an excess of IPDI with simple polyhydric alcohols of the molecular weight range 62–300, in particular with trimethylolpropane. Naturally, any desired mixtures of the stated polyisocyanates may also be used for the production of the products according to the invention.

Further suitable polyisocyanates are the known prepolymers having terminal isocyanate groups, as are in particular accessible by the reaction of the above-stated simple polyisocyanates, principally diisocyanates, with substoichiometric quantities of organic compounds with at least two groups capable of reacting with isocyanate groups. The compounds used to this end are preferably such compounds having at least two amino groups and/or hydroxyl groups with a number average molecular weight of 300 to 10000, preferably 400 to 6000.

In these known prepolymers, the ratio of isocyanate groups to hydrogen atoms reactive with NCO is 1.05 to 10:1, preferably 1.1 to 3:1, wherein the hydrogen atoms preferably originate from hydroxyl groups.

The type and quantity ratios of the starting materials used in the production of the NCO prepolymers are furthermore preferably selected such that the NCO prepolymers have a) an average NCO functionality of 2 to 4, preferably from 2 to 3 and b) a number average molecular weight of 500–10000, preferably from 800–4000.

The isocyanate groups of the polyisocyanates are completely capped. Customary capping agents may be used for capping, as are for example used in the lacquers sector. Examples of capping agents which may be used are dimethyl malonate, diethyl malonate, ethyl acetoacetate, epsilon-caprolactam, acetanilide, acetylacetone, acetone oxime, 1,2-propanediol and/or butanone oxime, wherein the last stated capping agent is preferred.

The polyisocyanates may for example be capped by heating one or more polyisocyanates with the capping agent. For example, one of more polyisocyanates may be introduced into a vessel and heated while being stirred to, for example approximately 80° C., and the capping agent apportioned (for example over some 10 min). Stirring is continued until the NCO value is less than 0.1%. It is also possible to cap one or more polyisocyanates with a mixture of two or more capping agents.

The advantage of using two or more different polyisocyanates and/or two or more different capping agents is that crosslinking may consequently proceed over a wide temperature range.

The binder composition according to the invention contains 0 to 10 wt. % related to the total weight of components A) to $D_2$) of one or more catalysts (component E). These are in particular catalysts soluble in organic solvents or in water or miscible with organic materials. Examples of suitable catalysts which are soluble in organic solvents or miscible with organic materials are phosphonium salts, such as for example ethyltriphenylphosphonium acetate, phosphate, chloride, bromide, iodide, butyltriphenylphosphonium acetate, phosphate, chloride, bromide, iodide, benzyltriphenylphosphonium acetate, phosphate, chloride, bromide, iodide and quaternary ammonium salts, such as for example alkylbenzyldimethylammonium chloride, benzyltrimethylammonium chloride, methyltrioctylammonium chloride, tetraethylammonium bromide, N-dodecylpyridinium chloride and tetraethylammonium iodide. The preferred catalysts which are soluble in organic solvents or miscible with organic materials are ethyltriphenylphosphonium acetate; ethyltriphenylphosphoniumphosphate, chloride, bromide; butyltriphenylphosphonium acetate, phosphate, chloride, bromide; benzyltriphenylphosphonium acetate, phosphate, chloride, bromide, and methyltrioctylammonium chloride. Ethyltriphenylphosphonium phosphate may for example be obtained from ethyltriphenylphosphonium acetate by reaction with phosphoric acid.

A further example for a catalyst is p-toluene sulfonic acid. It is also possible to react the glycidyl functionalized resin with p-toluene sulfonic acid which can, e.g. be carried out at elevated temperatures, e.g. up to 80° C. In this case, the p-toluene sulfonic acid is added and the oxirane ring is opened. When the obtained lacquer is cured at elevated temperatures, the p-toluene sulfonic acid is recovered by splitting and catalyses the cross-linking of a COOH/epoxide.

The catalyst soluble in organic solvents and/or water or miscible with organic materials may be contained in a quantity of approximately 0 to approximately 10.0 wt. %, for example from 0.1 to 10.0 wt. %, preferably from 0.3 to 2.0 wt. %, related to the sum of the weights of components A) to $D_2$).

It is also possible to link an amine catalyst with the COOH-functionalised (meth)acrylate resin mixture. This conveniently proceeds by copolymerising tert.-amino(meth) acrylic monomers during synthesis of the COOH-functionalised (meth)acrylate resin.

Examples of such monomers are dimethylaminoethyl (meth)acrylate, diethylaminopropyl (meth)acrylate and dimethylaminopropyl (meth)acrylate. The proportion of these (meth)acrylates is between 0.5 and 10 wt. %, preferably 1 to 5 wt. %, related to the total solids content of the COOH-functionalised (meth)acrylate resin.

The coating compositions according to the invention contain 0.1 to 10 wt. % of one or more thermally activated initiators as component F). Such initiators decompose to form free radicals. The quantity used is preferably 1 to 6 wt. % related to the total quantity of components A) and B). Customary thermally activated initiators may for example be used as initiators, such as the peroxides familiar to the person skilled in the art, such as for example di-tert.-butyl peroxide, tert.-butyl perbenzoate, tert.-butyl peroctoate; hydroperoxides such as for example tert.-butyl hydroperoxide, cumene hydroperoxide; and azo compounds such as for example azo-bis-isobutyronitrile.

Preferred initiators are, however, those with labile carbon-carbon bonds (so-called C—C initiators), such as for example benzopinacole derivatives such as for example benzopinacole, benzopinacole disilyl ethers (monomeric or oligomeric), benzopinacole dimethyl ethers together with tetraphenylethane and tetraphenylethanedinitrile.

The coating compounds according to the invention may also contain customary photoinitiators as component F), as are used for free-radical and ionic polymerisation. Those initiators which absorb in the wavelength range 190 to 400 nm are suitable.

Examples of free-radical initiators which may be used are initiators containing chlorine, such as aromatic compounds containing chlorine as for example described in U.S. Pat. No. 4,089,815; aromatic ketones as described in U.S. Pat. No. 4,318,791 and EP-A-0 161 463; hydroxyalkyl phenones as described in U.S. Pat. No. 4,347,111; water-soluble initiators, for example based on hydroxyalkyl phenones as described in U.S. Pat. No. 4,602,097, unsaturated initiators such as OH-functional aromatic compounds esterified for example with acrylic acid as described in U.S. Pat. No. 3,929,490, EP-A-0 143 201 and EP-A-0 341 560; or combinations of such initiators as are for example described in U.S. Pat. No. 4,017,652.

Specific examples are 2-methyl-2-hydroxypropiophenone, benzophenone, thioxanthone derivatives, acyl phosphine oxides and Michler's ketone.

Particularly preferred free-radical initiators which may be used are phosphine oxides and combinations of phosphine oxides with further customary initiators as described above.

Examples of cationic initiators which may be used are triaryl sulphonium salts of the general formula

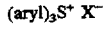

in which aryl represents an aryl residue, such as the phenyl residue, and $X^-$ is an anion such as $SbF_6^-$, $PF_6^-$, $AsF_6^-$ and $BF_4^-$, as described in U.S. Pat. No. 4,417,061, EP-A-0 327 194 and DE-A-2 904 626. Further examples of cationic initiators are oxonium salts, iodonium salts and diazonium salts, as are for example described in the following references: EP-A-0 464 131, U.S. Pat. No. 4,421,904, EP-A-0

145 633, EP-A-0 310 881, EP-A-0 310 882 (iodonium salts); DE-A-3 808 590 and DE-A-3 808 591 (diazonium salts).

Apart from these initiators, metallocene complexes may also be used, as are for example described in EP-A-0 094 915.

The binder compositions according to the invention may be used for the production of coating compositions. They may contain solvents, such as are for example customary in the production of coating compositions, for example lacquers.

Examples of such solvents are organic solvents, such as aliphatic and aromatic hydrocarbons, for example toluene, xylene, mixtures of aliphatic and/or aromatic hydrocarbons, esters, ethers and alcohols. These are customary lacquer solvents. Aqueous solutions may also be prepared in the production of coating compositions from the binders according to the invention. Suitable emulsifiers, as are customary in the lacquers sector, may optionally be used to this end.

The binder compositions according to the invention, together with the coating compositions according to the invention may also be in aqueous form, wherein they contain no organic solvents or have only a small proportion of organic solvents. To produce aqueous compositions, it is for example possible largely to eliminate organic solvents from the component A) containing carboxyl groups, for example by distillation, then to neutralise some of the carboxyl groups, for example with bases such as triethylamine or dimethylethanolamine and then emulsifying in water, which is optionally heated. The other resins may then optionally be emulsified into this emulsified resin. This is, for example, achieved by heating the emulsified resin to 60°–80° C. and, over a period of 5 to 120 minutes, stirring in the hydroxy- and/or epoxy-functional resins which have also been heated to 60°–80° C.

It is also possible to mix the component A) COOH-functionalised resin and the component B) epoxy resin, from both of which the solvents have largely been eliminated, and to emulsify them into a water/emulsifier mixture by means of a rotor/stator apparatus. It is also possible to emulsify the components separately and to mix the emulsions.

The binder compositions according to the invention together with the coating compositions according to the invention may optionally contain one or more reactive diluents. These may for example be used to adjust viscosity. Examples of reactive diluents are (meth)acryloyl-functional monomers and oligomers. Specific examples are (meth) acrylates such as for example lauryl (meth)acrylate, alkyl glycol di(meth)acrylates such as ethylene glycol di(meth) acrylate, diethylene glycol di(meth)acrylate, propylene glycol di(meth)acrylate, tripropylene glycol di(meth)acrylate, 1,6-hexamethylene di(meth)acrylate, trimethylolpropane tri (meth)acrylate, trimethylolpropanetriethoxy tri(meth) acrylate, pentaerythritol tri(meth)acrylate, pentaerythritol tetra(meth)acrylate, together with ethoxylated and propoxylated variants or 2-acetoxyethyl methacrylate.

The binder compositions according to the invention may contain customary additives, or additives may be used in the production of the coating compositions. Additives which may be used are those customary in the lacquers sector, the quantities are within the customary ranges familiar to the person skilled in the art.

Example of additives are pigments, for example coloured pigments such as titanium dioxide or carbon black and effect pigments such as metal flake pigments and/or pearlescent pigments. The binder compositions formulated according to the invention are also suitable for coating compositions containing such effect pigments. These coating compositions preferably contain effect pigments together with coloured pigments or coloured pigments together with extenders. Further examples of additives are customary lacquer extenders such as for example talcum and silicates, plasticisers, light stabilisers, stabilisers and flow-control agents such as silicone oils. These are also used in customary quantities familiar to the person skilled in the art.

Coating compositions produced from binders according to the invention are suitable for coatings which adhere to many substrates, such as for example wood, textiles, plastics, glass, ceramics and in particular metal.

The coating compositions according to the invention may be applied using known processes, such as spraying, dipping, rolling or knife application. To this end, the topcoat lacquer is applied to the substrate, which has optionally already been provided with other lacquer layers. After a flash-off phase, the applied coating composition is cured by heating. Baking temperatures are between 20° to 180° C., preferably 60° to 150° C. If the composition contains photochemically activated free-radical initiators, it may be cured by irradiation, for example with UV light, simultaneously with baking or subsequently to baking. The thickness of the baked film is approximately 15 to 60 μm. Baking produces a crosslinked, hard, glossy and acid-resistant lacquer coating.

A preferred embodiment is application of the coating composition according to the invention as a clear lacquer coating onto a base lacquer, preferably an aqueous base lacquer. It is possible here to work wet-on-wet, or the base lacquer may be previously dried by heating. This produces particularly good adhesion between the two layers.

Using the coating compositions according to the invention formulated without pigments as clear lacquers, it is possible to overcoat base lacquers which may contain customary topcoat pigments; they preferably contain effect pigments such as for example metallic pigments. The base lacquer binder is preferably based on polyester, polyurethane or acrylate resins. These binders may optionally be crosslinked with crosslinking agents, for example derivatives of melamine or isocyanate.

Below are listed several further examples of base lacquers which may preferably be coated with lacquers according to the invention which have been formulated without pigments as clear lacquers or with pigments as topcoat lacquers.

Aqueous base lacquers based on 5 to 95% of an aqueous epoxy-functionalised emulsion polymer and 95 to 5 wt. % of an anionic polyurethane dispersion with an acid value of 5 to 10 mg KOH/g. Suitable grinding resins for such pigments and additives used in aqueous base lacquers are in particular poly(meth)acrylate resins (for example in a quantity of up to 20 wt. %). Examples of such aqueous base lacquers are described in DE-A-36 28 124.

Base lacquers based on polyesters with a glass transition temperature of >30° C., melamine resins (for example partially butylated melamine resins), polyurea plasticisers (for example based on an adduct of butyl urethane and formaldehyde) and a polyethylene (85 wt. %)/vinyl acetate (15 wt. %) copolymer as wax dispersion. Such base lacquers may contain customary additives such as cellulose acetobutyrate (for example with differing molecular weight ranges). Examples of such base lacquers are described in EP-A-187 379.

An example of solvent-based base lacquers which are particularly suitable for repair purposes contains physically drying binders based on thermoplastic polyester and/or acrylic resin mixed with cellulose ethers or cellulose esters and/or polyvinyl acetates. Also contained are self-curing acrylic resin binders containing colour pigments and having hydrogen atoms which react with isocyanate, additionally together with mixtures of cellulose ethers and/or cellulose esters and/or cellulose semi-esters dissolved in solvents. Such lacquers are for example described in DE-OS 29 24 632.

All the preceding base lacquer formulations may contain customary lacquer additives, together with customary extenders and coloured pigments together with metal pigments such as aluminium or stainless steel bronzes and other effect pigments.

Powder coatings are also examples of base lacquers which may be coated with clear lacquers based on coating compositions according to the invention, as are for example described in "Products Finishing", April 1976, pages 54–56.

It is possible to heat the lacquer, e.g. to 60° to 100° C. and to apply it while hot. This reduces the viscosity of the lacquer and it can be applied with a high solids content.

It is also possible to add super-critical carbon dioxide as a solvent to the lacquer and to apply it in accordance with the so-called Unicarb process, which, e.g. is described in EP-A 0 321 607 and in EP-A 0 388 927.

The coating compositions according to the invention may also be formulated both as base lacquers and as fillers. They are then particularly suitable for the production of multi-layer lacquer coatings, for example in the automotive sector. When formulating the coating compositions as base lacquers or fillers, customary additives, as for example described above for base lacquers, may be added.

In comparison with customary base lacquers, the base lacquers according to the invention in particular provide coatings with improved moisture-temperature resistance, which is determined by their particularly good crosslinking action.

The base lacquers according to the invention may be overcoated wet-on-wet with customary clear lacquers, optionally after brief initial drying. They are preferably overcoated with clear lacquers based on coating compositions according to the invention.

The coating compositions according to the invention are in particular suitable for topcoat lacquers or clear and base lacquers, which are preferably used in the automotive sector, but also in other areas. Use of the coating composition according to the invention in multi-layer lacquer coating is particularly suitable for mass production automotive lacquer coating, but it may also be used for other purposes, such as for example household appliances or in the furniture industry in order to obtain coatings with particularly high acid stability.

In the following examples, parts (pt.) and % relate to weight.

EXAMPLE 1

Production of a Carboxy-Functional Resin (Component A)

1375 parts of xylene are introduced into a 4 liter, three-necked flask fitted with stirrer, thermometer, dropping funnel and reflux condenser and are heated while being stirred to refluxing temperature (approx. 140° C.). Over 5 hours, a mixture of 264 pt. acrylic acid
292 pt. styrene
294 pt. butyl acrylate
470 pt. butyl methacrylate and
55 pt. tert.-butyl perbenzoate is added dropwise. After 4 hours' post-polymerisation, 334 parts of epsilon-caprolactone are added dropwise within 30 minutes. The reaction is performed at 140° C. until the theoretical solids content is achieved.

The carboxy-functional resin has a solids content of 57.5% (1 h, 150° C.), an acid value of 120 mg KOH/g and a viscosity of 5600 mPas (25° C.).

For use in an aqueous clear lacquer (example 5), the carboxy-functional resin is evaporated under a vacuum to a solids content of 91.6%.

EXAMPLE 2

Production of an Epoxy-Functional Resin Without Acryloyl Groups 1250 parts of xylene are introduced into a 4 liter, three-necked flask fitted with stirrer, thermometer, dropping funnel and reflux condenser and are heated while being stirred to refluxing temperature (approx. 140° C.). Over 5 hours, a mixture of 750 pt. glycidyl methacrylate
155 pt. styrene
195 pt. butyl acrylate
100 pt. butyl methacrylate and
50 pt. tert.-butyl perbenzoate is added dropwise and post-polymerised for 6 hours.

The epoxy-functional resin has a solids content of 49.4% (1 h, 150° C.)

Production of an Epoxy- and Acryloyl-Functional Resin (Component B)

a) 2250 parts of xylene are introduced into a 6 liter, three-necked flask fitted with stirrer, thermometer, dropping funnel and reflux condenser and are heated while being stirred to refluxing temperature (approx. 140° C.). Over 5 hours, a mixture of 1350 pt. glycidyl methacrylate
279 pt. styrene
351 pt. butyl acrylate
180 pt. butyl methacrylate and
90 pt. tert.-butyl perbenzoate is added dropwise and post-polymerised for 6 hours.

b) 2200 parts of this resin are heated to 120° C. while being stirred in a 4 liter flask fitted with stirrer, thermometer, dropping funnel and reflux condenser. At this temperature, 477 parts of butyl acetate, 6.6 parts of triphenyl phosphite and 1.4 parts of methylhydroquinone are added. After 30 minutes' homogenisation, a mixture of 238 parts of butyl acetate and 110 parts of acrylic acid are added within 20 minutes. The reaction is continued at 120° C. until an acid value of 1 mg KOH/g is reached. The reaction mixture is then evaporated under vacuum to a solids content of approximately 80%. The resin has a solids content of 83.5% (1 h, 150° C.).

EXAMPLE 3

Production of Coating Compositions

In the following examples and in the comparative test, the following components are used catalyst (component E) is a 20% solution of ethyltriphenylphosphonium chloride in ethanol, melamine resin (component D) is a customary commercial methylated melamine resin (Cymel 325®), and the free-radical initiator (component F) is a customary commercial oligomeric benzopinacole silyl ether.

EXAMPLE 4

Production of a Clear Lacquer Composition

The following formula is used to produce a clear lacquer composition 41.6 pt. carboxy-functional resin from example 1
25.4 pt. epoxy- and acryloyl-functional resin from example 3b
6.8 pt. catalyst solution
16.6 pt. butyl acetate
1.7 pt. butyl diglycol acetate
6.3 pt. melamine resin
1.6 pt. free-radical initiator The solids content of the clear lacquer composition is 52.0%.

Comparative Test

A clear lacquer composition is produced as in example 4, wherein however an epoxy-functional resin without acryloyl groups, i.e. without component B), is used. The following formula was used:

50.8 pt. carboxy-functional resin from example 1
33.9 pt. epoxy-functional resin from example 2
6.9 pt. catalyst solution
2.0 pt. butyl diglycol acetate
6.4 pt. melamine resin The solids content of the clear lacquer is 52.4%.

The clear lacquers from example 4 and the comparative test are applied with a coating knife to a dry film thickness of 44 μm on an iron sheet or a glass plate and, after flashing-off at room temperature for 10 minutes, are baked for 20 minutes at 140° C. Hard, glossy films with good solvent and sulphuric acid resistance are produced.

| | Clear lacquer from example 4 | Clear lacquer from comparative test |
|---|---|---|
| König pendulum hardness | 151s | 134s |
| MEK rub | >100 | >100 |
| Erichsen indentation | 5.6 mm | 4.7 mm |
| H₂SO₄ (10%, 65° C.) | 17 min | 16 min |

MEK rub means an abrasion test using a swab impregnated with methyl ethyl ketone.

The clear lacquer coating obtained with the example 4 clear lacquer according to the invention has greater hardness in comparison with the coating obtained in the comparative test; nonetheless, its elasticity is higher than that of the coating obtained with the comparative clear lacquer.

EXAMPLE 5

Production of an Aqueous Clear Lacquer a) Production of an aqueous emulsion:

155.2 parts of a 10% solution of an emulsifier based on a polyoxypropylenepolyoxyethylene sorbitan diester are introduced into a 1 liter flask at 60° C. The mixture is stirred with a stirrer which rotates at a speed of approximately 8500 rpm. Within 3 minutes, a mixture of 257 parts of carboxy-functional resin from example 1, 157 parts of epoxy- and acryloyl-functional resin from example 3b) and 39 parts of melamine resin are added at 60° C.

The milky white emulsion obtained has a solids content of 52.5%.

b) Production of aqueous clear lacquer composition 76.5 pt. emulsion from example 5a
5.4 pt. catalyst solution
18.0 pt. completely deionised water The aqueous clear lacquer has a solids content of 41.3%. The lacquer is applied with a spray gun (1.3 mm jet) to a dry film thickness of approximately 40 μm onto bare iron sheet or onto iron sheet coated with a multi-layer lacquer coating with an electrocoated primer, filler and aqueous base lacquer and, after 20 minutes' flashing-off (10 min room temperature, 10 min 80° C.), baked for 20 minutes at 140° C.

The baked films obtained have good hardness, high gloss and good resistance against sulphuric acid and premium petrol.

We claim:

1. A binder composition suitable for coating compositions, which binder comprises A) 25 to 75 wt % of one or more resins containing carboxyl groups, with a number average molecular weight (Mn) of 500 to 10000 g/mol and an acid value of 15 to 200 mg KOH/g, B) 25 to 75 wt. % of one or more polyethers, polyesters, polyether-polyesters and/or (meth)acrylic copolymers, each containing groups of the formulas:

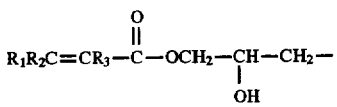

and/or

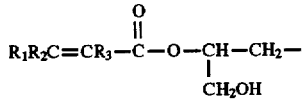

and having at least one α,β-unsaturated group and at least one epoxy group per molecule;

wherein $R_1$, $R_2$ and $R_3$ are each independently hydrogen or an unbranched or branched alkyl with 1 to 10 carbon atoms; wherein the α,β-unsaturated groups and epoxy groups are present in a numerical ratio of 20:80 to 80:20, with a number average molecular weight (Mn) of up to 10000 g/mol, said molecular weight applies to all of the polyethers, polyesters, polyether-polyesters, and (meth) acrylic copolymers, C) 0 to 60 wt. % of one or more polyols with at least two hydroxyl functional groups per molecule, $D_1$) 0 to 20 wt. % of one or more melamine resins, $D_2$) 0 to 40 wt. % of one or more capped polyisocyanates, wherein the sum of the weight percentages of components A), B), C), $D_1$) and $D_2$ is 100 wt. %, together with E) 0 to 10 wt. % of one or more catalysts to catalyze the reaction of the carboxyl and epoxy groups, related to the sum of the weights of components A) to $D_2$, and F) 0.1 to 10 wt. % of one or more thermally or photochemically activated initiators, related to the total weight of component A) and B).

2. A binder composition according to claim 1, in which the component A) resins are one or more optionally $\alpha,\beta$-unsaturated (meth)acrylic copolymers containing carboxyl groups and/or one or more optionally $\alpha,\beta$-unsaturated polyesters containing carboxyl groups.

3. A binder composition according to claim 1, in which the resin components A) and B) are at least partially precondensed.

4. A binder according to claim 1, wherein component B was at least in part produced in the presence of component C.

5. A binder composition according to claim 4, wherein component C is a hydroxy-functional polyester.

6. A coating composition containing the binder composition according to claim 1.

7. A coating composition according to claim 6 in the form of a lacquer containing solvent.

8. A coating composition according to claim 7 with a solvent content of 5 to 60 wt. % based on the entire composition.

9. A coating composition according to claim 6 which contains water and optionally one or more organic solvents.

10. A coating composition according to claim 6 in the form of a powder coating.

11. A coating composition according to claim 6 in the form of a clear lacquer with no pigments nor extenders optionally containing additives customary in lacquers.

12. A coating composition according to claim 6 in the form of a topcoat or base lacquer containing pigments, extenders and/or additives customary in lacquers.

13. A process for the production of a coating composition according to claim 6, wherein a binder composition according to one of claims 1 to 5 is dissolved or dispersed in one or more organic solvents and/or water, optionally after partial neutralization of the carboxyl groups present and, before or after dissolving or dispersing, is mixed with additives and/or pigments and/or extenders customary in lacquers.

* * * * *

UNITED STATES PATENT AND TRADEMARK OFFICE
CERTIFICATE OF CORRECTION

PATENT NO. : 5,710,208
DATED : January 20, 1998
INVENTOR(S) : K. Bederke et al.

It is certified that error appears in the above-identified patent and that said Letters Patent is hereby corrected as shown below:

Column 4, line 16, change " trimethylethane " to --trimethylol-ethane--.
Column 5, line 3, change "CF" to --CR--.
Column 9, line 21, change "one of" to --one or--.

Signed and Sealed this

Twenty-sixth Day of May, 1998

Attest:

BRUCE LEHMAN

Attesting Officer

Commissioner of Patents and Trademarks